(12) United States Patent
Teeters et al.

(10) Patent No.: US 7,862,920 B1
(45) Date of Patent: Jan. 4, 2011

(54) CHARGED ARRAYS OF MICRO AND NANOSCALE ELECTROCHEMICAL CELLS AND BATTERIES FOR COMPUTER AND NANODEVICE MEMORY AND POWER SUPPLY

(75) Inventors: Dale Teeters, Sand Springs, OK (US); Anthony Layson, Newark, OH (US); Christina Dewan, Tulsa, OK (US)

(73) Assignee: The University of Tulsa, Tulsa, OK (US)

( * ) Notice: Subject to any disclaimer, the term of this patent is extended or adjusted under 35 U.S.C. 154(b) by 0 days.

(21) Appl. No.: 12/762,133

(22) Filed: Apr. 16, 2010

Related U.S. Application Data (62) Division of application No. 10/913,918, filed on Aug. 6, 2004, now Pat. No. 7,704,615.

(60) Provisional application No. 60/493,313, filed on Aug. 7, 2003.

(51) Int. Cl.
*H01M 10/46* (2006.01)
*H01M 16/00* (2006.01)

(52) U.S. Cl. .............................. 429/9; 429/92; 429/149; 361/434; 365/153

(58) Field of Classification Search ..................... 429/9, 429/92, 93, 149, 152; 361/434, 541; 365/153
See application file for complete search history.

(56) References Cited

U.S. PATENT DOCUMENTS

| | | | |
|---|---|---|---|
| 6,197,450 B1 * | 3/2001 | Nathan et al. ............... | 429/236 |
| 6,256,767 B1 * | 7/2001 | Kuekes et al. ................. | 716/9 |
| 6,314,019 B1 * | 11/2001 | Kuekes et al. ............ | 365/153 X |
| 6,586,133 B1 * | 7/2003 | Teeters et al. ................ | 429/152 |
| 7,704,615 B1 | 4/2010 | Teeters et al. | |
| 2002/0009632 A1 * | 1/2002 | Kim et al. .................... | 429/122 |

OTHER PUBLICATIONS

Nonobatteries: Decreasing Size Power Sources for Growing Technologies; David A. Lowry and Adrian Patrut; Recent Patents on Nanotechnology 2008, 2, 208-219.
K.Kinoshita, Development of a carbon-based lithium microbattery, Journal of Power Sources 81-82(1999)170-175.
Kyoo-Seung Han, Fabrication temperature and applied current density effects on the direct fabrication of lithium nickel oxide thin-film electrodes in LiOH solution by the electrochemical-hydrothermal method,Solid State Ionics 121(1999) 229-233.
A Levasseur, X-ray photoelectron spectroscopy: A powerful tool for a better characterization of thin film materials, Buil. Mater. Sci., vol. 22, No. 3, May 1999, pp. 607-614.
Y. J. Park,Fabrication of LiMn2O4 thin films by sol-gel method for cathode materials of microbattery, Journal of Power Sources 76 (1998)41-47.
Y.J. Park, Characterization of tin oxide/LiMn2O4 thin film cell, Journal of Power Sources 88(2000)250-254.

(Continued)

*Primary Examiner* — Stephen J. Kalafut
(74) *Attorney, Agent, or Firm* — Head, Johnson & Kachigian, P.C.

(57) ABSTRACT

A sequence or array of electrochemical cells storing both digital and analog data. Both binary code and codes having a higher base may be stored in the memory device to increase information density. Such battery arrays could also provide power for the micro or nanodevice. Devices are microscale and nanoscale in size and utilize electrically conductive atomic force microscopy tips to record and read data stored in the device.

30 Claims, 8 Drawing Sheets

OTHER PUBLICATIONS

Y.J.Park, Electrochemical properties of LiMn2O4 thin films: suggestion of factors for excellent rechargeability, Journal of Power Sources 87(2000)69-77.

Seung-Joo Lee,Fabrication of thin Film LiCo0.5Ni0.5O2 Carhode for Li Rechargeable Microbattery, J. Electrochem. Soc.,vol. 143, No. 11, Nov. 1996.

Steven D. Jones, A microfabricated solid-state secondary Li Battery, Solid State Ionics 86-88 (1996) 1291-1294.

Harpreet Binhar and Brett Zuniga, Lithium polymer battery systems using poly(chloroacetylene) electrodes, Department of Chemical Engineering, and Dale Teeters, Department of Chemistry, The University of Tulsa, 600 S. Ave., Tulsa, OK 74104.

Takao Nagatomo, Large-Scaled Polyacetylene Batteries, Shibaura Institute of Technology, Shibaura, Minato-ku, Tokyo 108, Japan, (Jun. 1985).

T. Nagatomo, Polyacetylene batteries- scaling up and problems, Synthetic Metals, 18(1987)649-654.

Nina Korzhova, Ionic Conduction in Polymer Electolyte/ Microporous Membrane Composites, Department of Chemical Engineering and Department of Chemistry, The University of Tulsa, Tulsa, OK 74104.

A. P. Alivisatos, Perspectives on the Physical Chemistry of Semiconductor Nanocrystals, J. Phys. Chem. 1996, 100, 13226-13239.

A. P. Alivisatos, Semiconductor clusters, nanocrystals, and quantum dots., American Association for the Advancement of Science 1996, Feb. 16, 1996 v271 n5251 p. 933(5).

Valerie J. Leppert, Structural and optical characteristics of ZnSe nanocrystals synthesized in the presence of a polymer capping agent, Materials Science and Engineering B52(1998)89-92.

John S. Bradley, The Chemistry of Transition Metal Colloids.

Tetsu Yonezawa and Naoki Toshima, Mechanistic consideration of formation of polymer-protected nanoscopic bimetallic clusters,Chem. Soc. faraday trans., 1995, 91(22), 4111-4119.

Naoki Toshima, Catalytic Activity and structural analysis of polymer-protected Au-Pd Bimetallic clusters prepared by the simultaneous reduction of HAuCl4 and PdCl2,J. Phys. Chem. 1992, 96, 9927-9933, The Journal of Physical Chemistry, vol. 96, No. 24, 1992.

Kunio Esumi, Preparation of colloidal silver-palladium alloys by UV-irradiation in mixtures of acetone and 2-propanol, Colloids and Surfaces A: Physicochemical and Engineering Aspects 109(1996)55-62.

D. M. Schaefer and R. Reifenberger, Fabrication of two-dimensional arrays of nanometer-size clusters with the atomic force microscope, Appl. Phys. Lett. 66(8), Feb. 20, 1995, 0003-6951/95/66(8)/1012/3/ $6.00.

T. Junno, Controlled manipulation of nanoparticles with an atomic force microscope, Appl. Phys. Lett. 66(26), Jun. 26, 1995, 0003-6951/95/66(26)/3627/3/$6.00.

Paul E. Sheehan and Charles M. Lieber, Nanotribology and Nanofabrication of MoO3 structures by Atomic Force Microscopy, Science vol. 272, May 24, 1996.

C. Baur, Robotic nanomanipulation with a scanning probe microscope in a networked computing environment, J. Vac. Sci. Technol. B 15(4), Jul./Aug. 1997, 0734-211X/97/15(4)/1577/4/$10.00.

S. L. Brandow, Nanolithography by displacement of catalytic metal clusters using an atomic force microscope tip, J. Vac. Sci. Technol. B 15(5), Sep./Oct. 1997, 0734-211X/97/15(5)1818/7/$10.00.

T. R. Ramachandran, Direct and controlled manipulation of nanometer-sized particles using the non-contact atomic force microscope, Nanotechnology 9 (1998)237-245, 0957-4484/98/030237.

W. Schindler, Nonoscale electodeposition: A new route to magnetic nanostructures?, Journal of Applied Physics vol. 87, No. 9, May 1, 2000, 002-8979/2000/87(9)/7007/3.

Veronica M. Cepak and C. R Martin, Preparation of Polymeric Micro- and Nanostructures using a template-based deposition method, Chem. Mater.,vol. 11, No. 5, 1999, 1363-1367.

M. P. Anantram, Coupling of carbon nanotubes to metallic contacts, Physical review B vol. 61, No. 20, May 15, 2000, 0163-1829/2000/ 61(20)/14219(6).

William P. King, Atomic force microscope cantilevers for combined thermomechanical data writing and reading, Appl. POhys. Lett. vol. 78, No. 9, Feb. 26, 2001, 0003-6951/2001/78(9)/1300/3.

Edward Grochowski and Roger F. Hoyt, Future trends in hard disk drives, IEEE Transactions on magnetics. vol. 32. No. 3, 1996.

D. A. Thompson, The future of magnetic data storage technology, IBM J Res,. Develop. vol. 44, No. 3, May 2000.

J. B. Bates, Rechangeable thin-film lithium microbatteries, Solid state Technology v36. n7 (Jul. 1993): pp. 59(5).

L. G. Salmon, Development of rechargeable microbatteries for autonomous mems applications, Solid-state sensor and actuator workshop, Hilton Head Island, South Carolina, Jun. 8-11, 1998.

Naichao Li, Rate Capabilities of Nanostructured LiMn2O4 Electrodes in Aqueous Electrolyte, Journal of the electrochemical Society,147(6) 2044-2049 (2000).

Naichao Li, A high-rate, high-capacity, nanostructured Tin Oxide electrode, Electrochemical and solid-state letters, 3 (7) 316-318 (2000).

Veronica M. Cepak, Chemical strategies for template syntheses of composite micro- and nanostructures, Chem. Mater. 1997, 9, 1065-1067.

Charles J. Patrissi, Sol-Gel-based template synthesis and Li-Insertion rate performance of nanostructured Vanadium Pentoxide, Jourhaol of the electrochemical Society, 146 (9) 3176-3180 (1999).

Guangli Che, Carbon nanotubule membranes for electrochemical energy storage and production, Nature , vol. 393, May 28, 1998.

S. V. Batty, LB films of novel polyethers and their salt complexes, Thin Solid Films 284-285(1996) 530-532.

Y. Zheng, Novel alternate layer LB film polymer electrolyte systems, Electrochimica Acta, vol. 43, Nos. 10-11, pp. 1633-1637, 1998, PII: S0013-4686(97)10065-2.

Janos H. Fendler, Colloid chemical approach to the construction of high energy density rechargeable lithium-ion batteries, science and technology, 20(1&2), 13-25(1999).

Seshumani Vorrey, Study of the ion conduction of polymer electrolytes confined in micro and nanopores, Electrochimica Acta 48(2003) 2137-2141.

Anthony Layson, Shailesh Gadad, Dale Teeters, Resistance measurements at the nanoscale: scanning probe ac impedance spectroscopy, Electrochimica acta 48(2003) 2207-2213.

Thomas Thurn-Albrecht, Nanoscopic templates from Oriented block Copolymer films, Adv. Mater. 2000. 12. No. 11.

William P. King, Atomic force microscope cantilevers for combined thermomechanical data writing and reading, Applied physics letters, vol. 78, No. 9, Feb. 26, 2001, 0003-6951/2001/78(9)/1300/3.

Edward Grochowski and Roger F. Hoyt, Future trends in hard disk drives, IEEE transactions on magnetics, vol. 32, No. 3, 1996, 0018-9464/96.

D. A. Thompson, The future of magnetic data storage technology, IBM J. Res. Develop. vol. 44, No. 3, May 2000.

Hideki Masuda, Preparation of microporous metal membranes by two-step replication of the microstructure of anodic alumina, Thin Solid Films. 223 (1993) 1 3.

Hideki Masuda and Kenji Fukuda, Ordered Metal Nanohole Arrays made by a two-step replication of honeycomb structures of anodic alumina, Science, vol. 268, Jun. 9, 1995.

* cited by examiner

CHARGED ARRAYS OF MICRO AND NANOSCALE ELECTROCHEMICAL CELLS AND BATTERIES FOR COMPUTER AND NANODEVICE MEMORY AND POWER SUPPLY

CROSS-REFERENCE TO PENDING APPLICATIONS

This application is a divisional application of U.S. patent application Ser. No. 10/913,918, filed Aug. 6, 2004, now U.S. Pat. No. 7,704,615, which is based on U.S. Provisional Patent Application No. 60/493,313 filed Aug. 7, 2003 and entitled "Charged Arrays of Micro and Nanoscale Electrochemical Cells and Batteries For Computer and Nanodevice Memory and Power Supply".

STATEMENT REGARDING FEDERALLY SPONSORED RESEARCH OR DEVELOPMENT

This invention was made with U.S. Government support under the Department of the Navy, Office of Naval Research contract N00014-01-1-0724 and the National Science Foundation contract EPS-0132534 awarded by the Department of Defense and the National Science Foundation. The U.S. Government has certain rights in the invention.

BACKGROUND OF THE INVENTION

1. Field of the Invention

The present invention relates to microscale and nanoscale arrays of electrochemical cells and batteries for computer and nanodevice memory and power supply. Specifically, the present invention relates to a two-dimensional array of electrochemical cells or batteries that may be used to store both digital and analog information. Techniques for both read-only and read-and-write memory storage are disclosed.

2. Prior Art

Nanotechnology is a rapidly expanding field. The desire for miniaturization of electronics, assays and memory devices stems from many factors. Smaller devices require less material, thereby reducing production costs. Because the distances between points are shorter, nanoscale circuitry operates much more quickly than larger circuit boards. Information stored in very small devices may be accessed and read very quickly. Smaller devices are also less cumbersome and more easily transported.

The extremely high speed and small volume of microscale and nanoscale memory devices make them highly desirable. This has led to research into a variety of methods to form extremely small memory storage devices.

Atomic force microscopy (AFM) cantilever tips have become a common tool in nanotechnology. AFM tips were originally developed in order to study surface topography of a material at the molecular level. Changes in the surface of as little as a few tenths of nanometers (Angstroms) may be discerned utilizing AFM tips. When an electric current is applied to an AFM tip it may also be used for scanning tunneling microscopy (STM). This also provides for nanometer scale readings of a surface's topography.

AFM tips have found a variety of other uses. They may be used to move individual atoms about a surface to create a variety of structures on the atomic level. AFM tips have also been used to puncture holes into a surface. For example, IBM has developed a method of using AFM tips to form patterns on a pliable surface (See, for example: W. P. King, T. W. Kenny, K. E. Goodson, G. C. M. Despont, U. Durig, H. Rothuizen, G. K. Binnig, P. Vettiger, Applied Physics Letters, 78, 1300 (2001); E. Gorchowski and R. F. Hoyt, IEEE Trans. Magn. 32, 1850 (1996); D. A. Thompson and J. S. Best, IBM J. Res. Dev. 44, 311 (2000)). The surface has a thin layer of a material having a relatively low melting point. An AFM tip is heated to a temperature above the surface's melting point and is applied to the surface. The tip melts a cavity into the surface. This device is used to store data in binary code. When a non-heated tip is run across a series of holes, a hole may serve as a "1" while portions of the material that are not punctured serve as a "0". One disadvantage of the IBM technique is that it is difficult and time consuming to effectively remove a single data point. Another disadvantage is that it is difficult to effectively erase stored data completely. The more data is stored and erased on a surface, the more convoluted the surface becomes and eventually no longer performs adequately. Another disadvantage is that this technique may only store digital, binary data.

Nanoscale batteries have also been of interest as means for supplying nanoscale devices. Thin-film rechargeable batteries with active layers of 1-10 μm have been of interest since the 1980s, and previous studies have dealt almost exclusively with thin film work (See, for example: J. B. Bates, G. R. Gruzalski, M. J. Dudney, C. F. Lick, H.-h. Yu, and s. D. Jones, *Solid State Technology*, 36, No 7, 59, 1993). Thin-film microbatteries have been made by a deposition technique using a metallic lithium electrode layer with a solid $Li_3PO_4$ electrolyte. However, these batteries have lateral dimensions greater than a centimeter and produced current densities of only 8.3 $\mu A/cm^2$ at an output voltage of approximately 4 V. A microbattery using a Ni/Zn electrode couple with an aqueous KOH electrolyte has also been developed (See, for example: L. G. Salmon, R. A. Barksdale, B. R. Beachem, R. M. LaFollette, J. N. Harb, J. d. Holladay, and P. H. Humble, "Development of Rechargeable Microbatteries for Autonomous MEMS Applications," in Solid-State Sensor and Actuator Workshop (Transducer Research Foundation, Inc. Hilton Head, S.C., 1998) pp 338-341). Once again, fabrication involves a deposition process for the two electrodes, with a polymer layer that is later removed to form the electrolyte cavity. These planar microbatteries were 200 μm×200 μm and had capacities of 200-200 $mC/cm^2$ at current densities of 10-20 $mA/cm^2$ with an operating voltage of 1.5 V. A carbon-based rechargeable lithium microbattery has been contemplated, but the progress in fabricating the electrode microstructure has been slow. This technology is based on photoresist technology commonly used in the semiconductor industry and electrodes are to be made from arrays of microelectrodes having diameters as small as 5 μm (See, for example: Kinoshita, K., Song, X., Kim, J., Inaba, M., Kim, J., *Journal of Power Sources* 82, 170 1999). The majority of the most recent papers on microbatteries follow these trends by describing systems where very thin films of electrolyte material were used to construct the battery, or by discussing the potential for these films to be used in batteries. The actual size of the batteries based on the electrode structure is much greater than the nanometer scale. (Levasseur, A., Vinatier, P., Gonbeau, D., *Bull. Mater. Sci.* 22 (3), 607 (1999); Han, K. S., Tsurimoto, S., Yoshimura, M., *Solid State Ionics* 121 (1-4), 229 (1999); Park, Y., Kim, J. G., Kim, M. K., Chung, H. T., Um, W. S., Kim, M. H., Kim, H. G., *J. Power Sources* 76 (1), 41 (1998); N. C. Li, C. J. Patrissi, G. G. Che, and C. R. Martin, *J. Electrochem. Soc.*, 147, 2044 (2000); N. C. Li, C. R. Martin, and B. Scrosati, *Electrochem. And Solid State Lett.*, 3, 316 (2000))

Additional attempts have been made to fabricate micro and nanobattery components and systems taking advantage of nanoscale technology and assembly. Nanoscale electrode systems have been made using a template synthesis method. Systems composed of $LiMn_2O_4$, $SnO_2$, $TiS_2$, sol-gel $V_2O_5$ materials, and carbon tubes have been used to make nanoscale electrode materials that typically show higher capacities, lower resistance, and lower susceptibility to slow electron-transfer kinetics than standard electrode configurations (V. M. Cepad, J. C. Hulteen, G. Che, K. B. Jirage, B. B. Lakshmi, E. R. Fisher, and C. R. Martin, *Chem. Mater.* 9, 1065 (1997); C. J. Patrissi and C. R. Martin, 146, 3176 (1999); G. G. Che, B. B. Lakshmi, E. R. Fisher, and C. R. Martin, *Nature* 393, 346 (1998); S. V. Batty, T. Richardson, F. B. Dias, J. P. Voss, P. V. Wright, and G. Ungar, *Thin Solid Films*, 284-285, 530 (1996); Y. Zheng, F. B. Dias, P. V. Wright, G. Ungar, D. Bhatt, S. V. Batty, and T. Richardson, *Electochim. Acta*, 43, 1633 (1998)). Langmuir-Blodgett films have been made that have ion-conducting layers that have the potential to be used as electrolytes in nanobattery systems. Self-assembly mechanisms may also be used to construct a high energy density rechargeable lithium ion batteries by using a layer-by-layer self-assembly of poly(diallyldimethyl-ammonium chloride), graphite oxide nanoplatelets and polyethylene oxide on indium tin oxide with a lithium wire as a counter electrode. Systems with 10 self-assembled layers have high specific capacities ranging from 1100 to 1200 mAH/g. (J. H. Fendler, *J. Dispersion. Sci. Tech.*, 20, 13 (1999); S. Vorrey and D. Teeters, *Electrochimica Acta*, 48, 2137 (2003); A. L. Layson, Shailesh Gadad, Dale Teeters, *Electrochimica Acta*, 48, 2207 (2003)).

Assignee is the owner of U.S. Pat. No. 6,586,133 for "Nano-Battery Systems" which is incorporated herein by reference, and which discloses a process of providing a membrane with a plurality of pores, filling the membrane pores with an electrolyte, and capping the filled pores with electrodes.

The use of AFM tips for fabrication and data storage has evolved separately from the techniques being developed for making nanoscale batteries. Nothing in the prior art has contemplated the use of arrays of miniaturized batteries to store data at a very small scale.

It is therefore desirable to develop a nanoscale storage device that may be erased and rewritten several times without deteriorating.

It is also desirable to develop a nanoscale memory device capable of storing analog information.

It is also desirable to provide a nanoscale memory device that uses and electronic charge or current to store both erasable and permanent information.

SUMMARY OF THE INVENTION

The present invention provides a memory storage device that is extremely small, efficient, fast, reliable and durable. It is comprised of several microscale or nanoscale electrochemical cells or batteries arrayed in sequence. Data is stored by either applying a charge to each cell or by designing various cells to produce a specific voltage when current is applied. An AFM tip or other type of current conducting probe of appropriate size is applied to the various cells or batteries in sequence to detect either the presence or lack of a charge or the level of conductance of a cell or battery.

Those skilled in the art will appreciate that various anode/cathode combinations provide electrochemical cells having a specific voltage. For example, electrochemical cells may be formed having either zinc or cadmium functioning as an anode. A silver cathode may be applied to the electrolyte of each of these cells. When a current is run through the cell being measured, cells having a cadmium anode will produce a different voltage than cells having a zinc anode. These two different values of voltage may serve as 0's and 1's.

Those skilled in the art will appreciate that there are a wide variety of materials with different electrochemical potentials suitable as anodes and cathodes. Each one provides a different electrochemical potential with a particular complementary electrode. Those skilled in the art will appreciate that this means that the present invention is capable of storing data in more than just binary code. The present invention allows information to be stored in codes having a base of three, four, five or even higher. This greatly increases the storage capacity of the memory device.

Data may also be stored using a more conventional binary system. Electrochemical cells may have a charge applied to them. A sequence of cells will comprise several cells, some of which are charged, and some of which are not. An uncharged cell may serve as a "0" and a charged cell may serve as a "1" in a common binary coding method. An AFM tip or other type of current conducting probe is used to apply a charge to various cells as the information is written upon the storage device. The same or another AFM tip or other type of probe may be later applied to the various cells to detect the presence or absence of a charge. In this fashion, the storage device may be read. This design provides for very simple and efficient write over or erasing of the memory device.

The electrochemical cells or batteries used in the present invention are formed in very small pores in a substrate film. Pores may be formed using a laser ablation, photolithographic techniques or other methods known in the art. The pores are then filled with an electrolyte material. Electrodes are then placed on either end of the pores. Some of the preferred methods of forming these nanoelectrochemical cells are described in Assignee's U.S. Pat. No. 6,586,133 to Teeters et al., which is hereby incorporated by reference. Instead of pores the individual micro and nanocells could be manufactured by standard integrated circuit techniques. For example the arrays of cathodes and anodes could be deposited by chemical vapor deposition techniques or physical vapor deposition techniques in to patterns created by photo resist technology. Likewise a solid electrolyte could be deposited by the same chemical vapor and physical vapor deposition techniques. The connections between the individual cells could also be made by deposition onto patterns created by photo resist techniques. Micro and nanolithographic techniques could also be used to create the pores for the electrolyte and to connect the individual cells or batteries. For example e-beam lithography or focused ion beam lithography could be used to create the pores for the batteries. Nanolithography techniques could be used to connect the individual cells or batteries. For instance focused ion beam lithography can be used to deposit the metallic connections between some or all of the individual batteries.

Those skilled in the art will appreciate that there are alternative methods of forming the cells. The cells could also be assembled by chemical self-assembly techniques where surfactant molecules or block copolymers would assemble on a flat cathode or anode substrate. In this technique the surfactant molecules and the block copolymers are composed of polar and nonpolar regions. When dissolved in a nonpolar solvent, the polar part of the molecule or copolymer will associate inside the nonpolar part of the surfactant molecule or copolymer forming a core of the polar material. When this solution is cast on a solid substrate making a thin film, evaporation of the solvent results in evaporation-induced self-assembly where the core polar material is surrounded by nonpolar material. This forms very ordered arrays of channels of the polar material. The polar materials in these surfactants and block copolymers would be of a chemical composition suitable for electrolyte use. Thus the micro and nanopores for the electrolyte would be made (See, for example: T. Thurn-Albrecht, R. Steiner, J. DeBouchey, C. M. Stafford, E. Huang, M. Bal, M. Tuominen, C. J. Hawker and T. Russell, *Adv. Mater.*, 12, 787 (2000)). The appropriate electrode could be placed on the pores or channels of electrolyte by placing the substrate in a solution containing suspended nanoparticles of the correct size to cover the pores or channels. The anode particles could then be made to adsorb from solution onto the pores, covering them and making the electrode. Alternatively, integrated circuit lithographic techniques, e-beam lithography or focused ion beam lithography could be used to make the electrode on top of the pores. Those skilled in the art of chemical self-assembly, integrated circuit lithographic techniques, e-beam lithography, focused ion beam lithography or other such techniques will appreciate that there are alternative methods of forming the cells.

The cells or batteries are preferably formed in a large array. Several AFM tips may be used simultaneously to read or write data on the device. Because the cells may also serve as electrical power supplies for micro and nanoscale devices, an array may include more than just cells or batteries utilized for data storage. A portion of an array may be utilized as a power source for a microscale or nanoscale device. Thus, the present invention may serve as both data storage and a power supply for extremely small scale machinery and devices.

Another significant advantage of the present invention is its ability to record analog information. While known methods of data storage utilizing AFM tips may only be used for digital storage, the present invention has far broader applications. When accessed by the AFM tip or other probe, the voltage of cells having various anode/cathode combinations changes with time through the natural discharge process of the cell. An AFM tip may be programmed to first contact the cell having a various anode or cathode prior to measurements. It may be programmed to measure voltage after a certain period of time has lapsed. This allows the value of the voltage measured to vary across a continuous spectrum of time within a range of voltages. Similarly, a charged battery cell shows a decreased charge over time. The charge decreases over time such that an AFM tip may be programmed to record the charge level after a specific time period has lapsed. This allows charged readings to be taken anywhere along a continuous range of charges. Both of these methods provide for the reading of a value somewhere within a continuous spectrum. This allows storage of analog data that is not possible with storage devices that only provide for reading and writing of digital data. Those skilled in the art will appreciate that this also provides a significant advantage over the prior art.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

The present invention comprises a device capable of storing information for computer applications and in microscale and nanoscale devices. Both digital and analog information may be stored. In addition, systems greater than base 2 may be designed. By using trinary or greater systems, the amount of data stored can be greatly increased. For example, three data points in a binary system allow for eight possible permutations. In a trinary system three data points allow for 27 possible permutations, more than a three-fold increase. Using a base four system allows for 64 permutations using only three data points. Those skilled in the art will appreciate that the ability to expand beyond the binary information storage system may increase the storage capacity of a memory device by an order of magnitude.

Figure 1:
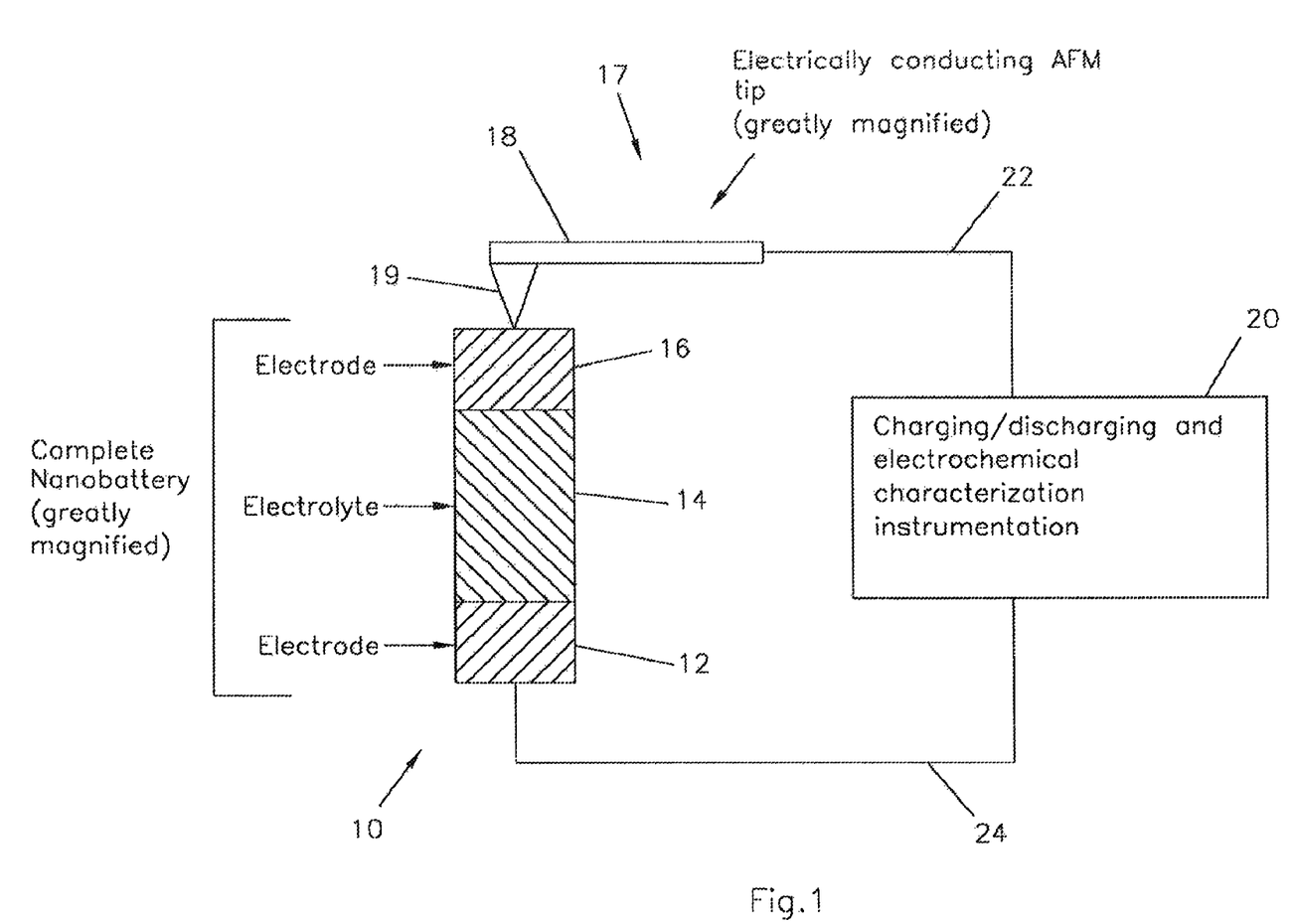
FIG. 1 shows a schematic diagram of a nanobattery.

In the present invention, information is generally stored by forming a sequence of microscale or nanoscale electrochemical cells. A typical cell is shown in FIG. 1. Electrochemical cell 10 is comprised of an electrode 12, an electrolyte 14 and a second electrode 16. The cell is incorporated into a substrate (not shown) using the methods described in U.S. Pat. No. 6,586,133, photolithography or other methods known in the art. AFM tip 17 or other type of current conducting probe of the appropriate size is applied to electrode 16. It is comprised of a cantilever 18 and a tip 19. Those skilled in the art will recognize this as a relatively standard AFM tip well known in the art. In the present invention, AFM tip 17 is electrically conductive. It is also connected to instrumentation 20 by circuit 22. Instrumentation 20 is also connected to electrode 12 by circuit 24. When electrically conductive AFM tip 17 is applied to electrode 16, instrumentation 20 may be used to detect a charge and/or the potential of the cell 10.

AFM tip 17 may also be used to apply a charge to cell 10 that is provided by instrumentation 20. Once a charge is applied, AFM tip 17 or a similar tip may be used to read the presence or absence of a charge. Similarly, an AFM tip may be used to remove a charge in cell 10.

Electrodes 12 and 16 may be comprised of any material suitable as an electrode. The following are compounds and materials that could be used for electrode materials, especially for lithium ion based battery systems. These materials or the corresponding alkali or alkaline metal ion materials could be used for battery systems based on the alkali or alkaline metals. The general class of these compounds is given above each group.

Inorganic Oxide Compounds $MoO_3$, $Cr_3O_8$, $V_2O_5$, $V_6O_{13}$, $LiV_3O_8$, $MnO_2$, $LiCoO_2$, $LiNiO_2$, $LiMn_2O_4$, $LiVO_2$, $LiCrO_2$, $WO_3$, $TiO_2$.

Inorganic Chalcogenides $TiS_2$, $MoS_2$, $NiPS_3$, $TiSe_3$, $TiTe_2$, $MoS_2$, $MoSe_2$, $InSe$.

Carbon and Fluorocarbon Compounds

Coke, Graphite, $CF_n$, $(C_2F)_n$, $C_7CoCl_2$. Polymeric materials poly(acetylene), poly(pyrrole), poly(vinylferrocene), poly(aniline), poly(p-phenylene), poly(phenylene sulfide).

Those skilled in the art will appreciate that there is a wide variety of suitable materials.

Electrolyte 14 may similarly be comprised of any number of materials, so long as it is suitably ionically conductive. Electrolyte 14 is typically a solution having either an aqueous or solid solvent and a solute capable of carrying a charge. Those skilled in the art will appreciate that there is a wide variety of solvent compounds as well as inorganic ions that will serve as suitable charge carrying solutes in the solvents. The following is a list of example materials that could be used for electrolyte materials. These are both liquid and solids:

- Aqueous (water) solutions containing appropriate ionic salts
- Poly(ethylene oxide) containing appropriate ionic salts
- Poly(propylene oxide) containing appropriate ionic salts
- Polyethylene glycols containing appropriate ionic salts
- Polypropylene glycols containing appropriate ionic salts
- Propylene carbonate containing appropriate ionic salt
- Ethylene carbonate containing appropriate ionic salt
- Comb-branched systems comprised of low molecular weight polyether chains grafted to polymer backbone. These must contain an appropriate ionic salt.

Gel electrolyte materials—These consist of polymer hosts such as polystyrene, poly(vinyl chloride), poly(vinyl alcohol), polyacrylonitrile, poly(vinylidene fluoride), and poly(ethylene oxide), which have had materials like propylene carbonate, ethylene carbonate, dioctyl sebacate, or diethyl phthalate added as plasticizers. These materials must contain an appropriate ionic salt.

Lithium Phosphorous Oxynitride

One type of battery suitable for use in the present invention is a lithium polymer battery. Lithium polymer batteries (LPBs) can be broadly defined as an all-solid-state system that, in their most common form, uses two lithium reversible electrodes with a lithium ion conducting polymer membrane as the electrolyte. The LPB cathode is usually based on a reversible intercalation compound (for instance $TiS_2$, $V_6O_{13}$, $LiV_3O_8$, $TiO_2$, $LiMn_2O_4$, etc.) blended with small portions of the polymer electrolyte and carbon to form a composite material. The carbon black increases the electron conduction of the composite cathode while the polymer electrolyte serves as binder for the cathode. When the cathode material is used as a nanoscale electrode, electrical conduction is not a problem because the particle is so small and/or thin that low electrical conduction is not a problem. Thus when making the nanobattery using nanoparticles or films of intercalation compounds that are less than 5.5 µm in thickness, we can use the pure intercalation compound without the need for a composite system with a high electron conducting material. The anode can be lithium metal or a lithium ion source electrode.

Other lithium batteries exist that do not use polymer electrolytes. One such battery uses lithium phosphorous oxynitride. This type of electrolyte can be deposited by a sputter coating process. The fact that this electrolyte can be sputter coated on the same anodes and cathodes as listed above for LPBs makes it an interesting electrolyte for nanobattery manufacturing.

Nanobatteries have been made from various cathode and anode materials such as graphite, $LiMn_2O_4$, $LiCoO_2$, $V_2O_5$, and $SnO_2$. These nanobatteries may be made using nanoporous membranes with well defined pores or channels. Those skilled in the art will appreciate that these are only a few of the many materials that may be used to form suitable nanobatteries for use in the present invention.

Figure 2:
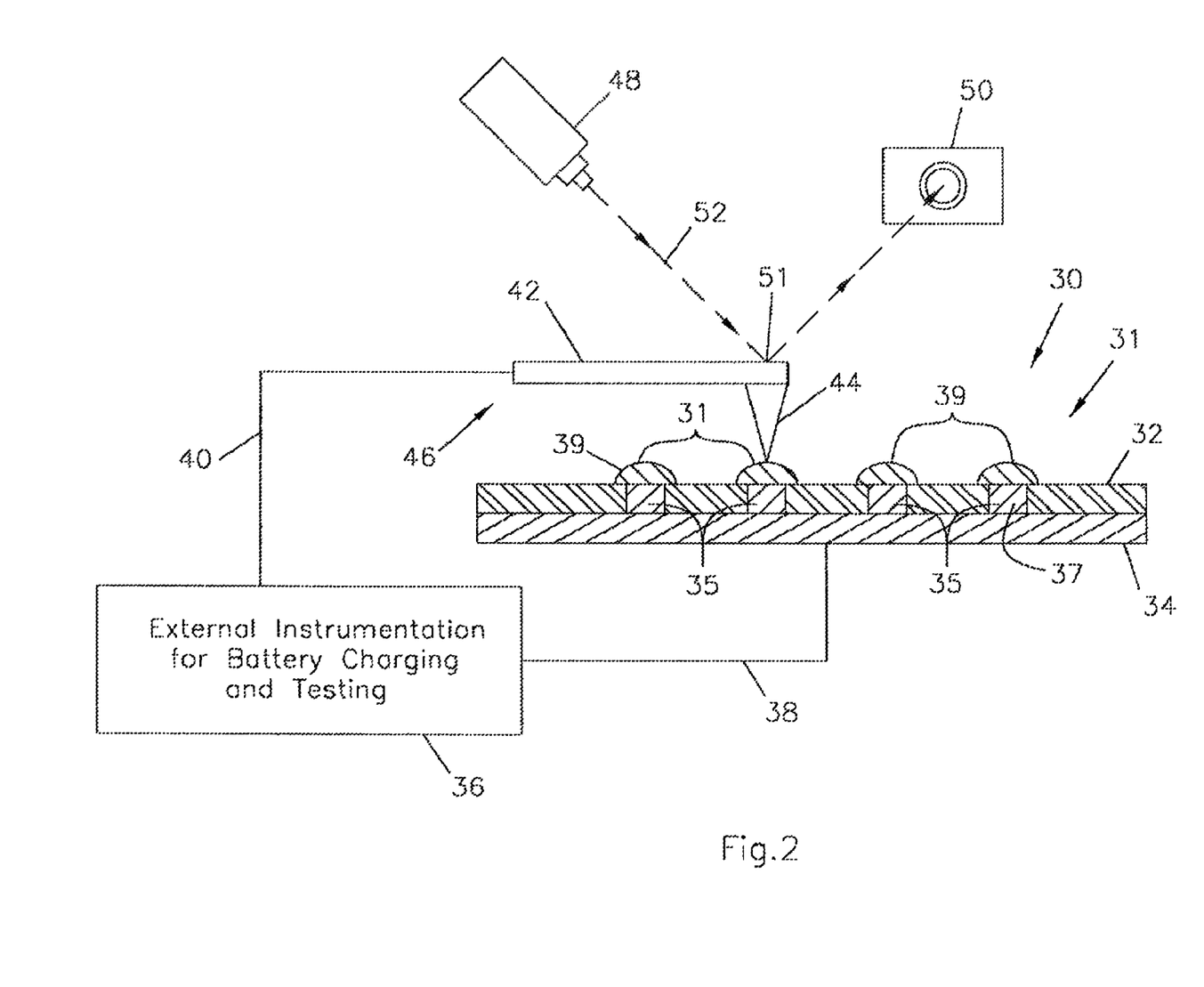
FIG. 2 schematically shows how an AFM tip is used to charge or test nanobatteries or microbatteries.

FIG. 2 shows a memory device 30 composed of a series of electrochemical cells in a substrate. Substrate 32 has a series of pores 35 into which electrolyte 37 has been placed. Electrode 34 coats the entire bottom portion of substrate 32, serving as an electrode for all the electrochemical cells 31. Electrode 34 is connected to instrumentation 36 by circuit 38. Instrumentation 36 is capable of measuring the electric potential of the individual cells 31, detecting the presence of a charge in a cell 31 and applying a charge to cells 31. Each electrochemical cell has a top electrode 39. These may be comprised of nanoparticles placed on top of wells 35 after electrolyte 37 has been placed in the pores. Electrodes 39 may also be formed using photolithographic or other techniques known in the art. Electrodes 39 may all be comprised of the same conductive material. Alternatively, electrodes 39 may be comprised of different materials. If electrodes 39 are composed of different materials they will form electrochemical cells having different open circuit potentials.

Instrumentation 36 is also attached to AFM tip 46 or other type of current conducting probe by circuit 40. AFM tip 46 is electrically conductive and comprises a cantilever 42 and a tip 44. As the tip 46 moves across substrate 32 it will come into contact with the electrodes 39 of cells 31. Because electrodes 39 protrude upwardly from substrate 32, tip 46 will likewise move upwardly when it comes in contact with them. This causes tip 46 to move up and down as shown by arrow 54 as it is moved across substrate 32. This motion is detected by using a laser generating device 48 that emits a laser 52 which reflects off tip 46 at point 51. When tip 46 moves up or down, the angle of reflection of laser 52 changes. Changes in reflection of laser 52 may be detected by sensor 50. When sensor 50 detects that tip 46 has moved in an upward direction, the operator will know that it has come into contact with an electrode 39. When this determination is made, instrumentation may be used to detect a charge, measure potential or apply a charge. This prevents accidental readings of zero charge or zero potential on substrate 32. Alternatively the entire surface of memory device 32 could have been characterized by the AFM previously. The AFM tip or other type of current conducting probe of the approximate size could then be moved exactly to the location of one of the electrodes 39 to detect a charge, measure potential or apply a charge.

The tip 46 may be used to erase data stored on storage device 30 by contacting each electrode 39 and removing any charge present. Once all charges are removed, storage device 30 is erased and contains no information recorded by the presence or absence of a charge. However, if electrodes 39 are comprised of differing materials, permanent, non-erasable data is still stored and detectable by measuring the differing potentials of the various electrodes.

Tip 46 may be used to apply a charge provided by instrumentation 36 to various electrodes. This will result in a sequence of electrodes that are either charged or uncharged. This may be used to store binary, digital information. Tip 46, or another AFM tip or other type of current conducting probe may later move across the same electrodes, detecting the presence or absence of a charge thereby reading a binary sequence in which information is stored.

One of the benefits of the present invention is that, because electrodes 39 may be composed of different materials, binary information may be recorded and erased by charging and discharging cells 31. This is combined with a permanent, non-erasable set of information stored by the differences in cell potential of the various electrodes. By using laser 52 to detect when tip 46 is in contact with and out of contact with cells 31, errors in reading the stored data is prevented.

Figure 3A:
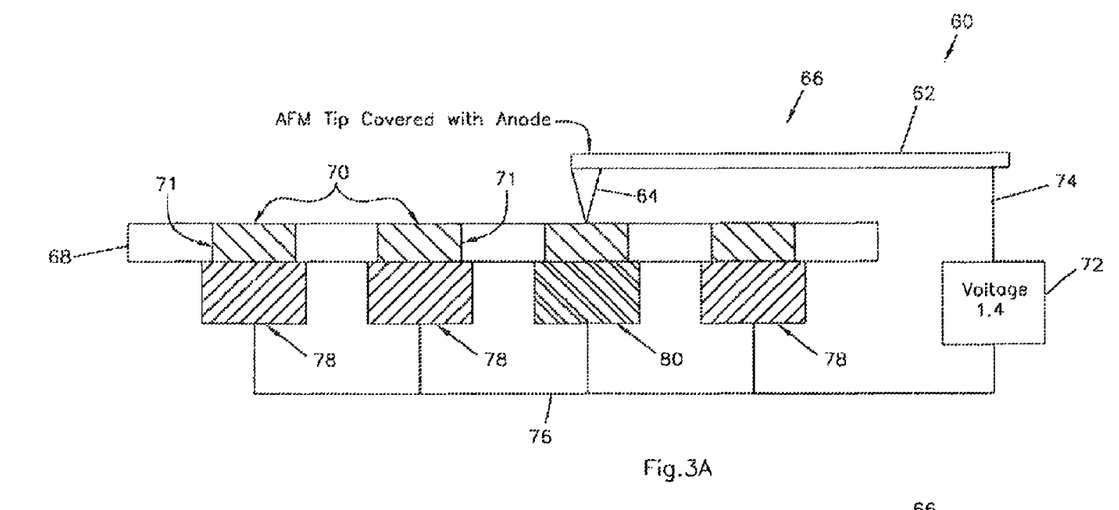
FIG. 3A shows how an AFM tip is used to measure the voltage of a nanocell or microcell.

FIG. 3A shows an alternative embodiment of the present invention. In this embodiment, storage device 60 has electrolyte material 70 within pores 71 of substrate 68. Underneath each of pores 71 is an electrode, either 78 or 80. For instance, electrodes 78 could be comprised of zinc, while electrodes 80 are comprised of cadmium. Electrodes 78 and 80 are connected to instrumentation 72 by circuit 76. Instrumentation 72 is also connected to AFM tip 66 by circuit 74. AFM tip 66 is comprised of cantilever 62 and tip 64. In this particular embodiment, tip 66 is coated with silver so that it is electrically conductive. In this embodiment, tip 64 serves as a second electrode such that pores 71 may serve as electrochemical cells. As tip 66 is moved across substrate 68, it comes in contact with the electrolyte materials 70 found in pore 71. In FIG. 3A, tip 64 has come in contact with electrolyte material 70 that is above the cadmium electrode 80. Instrumentation 72 measures the potential in volts across the electrolyte material between tip 64 and electrode 80. As shown in the figure, electrochemical cell having a silver cathode and cadmium anode has a potential of approximately 1.4 volts. Alternatively, the entire surface of memory device 60 could have been characterized by the AFM previously. The AFM tip or other type of current conducting probe could then be moved exactly to the location one of the electrodes 39 to measure potential.

Figure 3B:
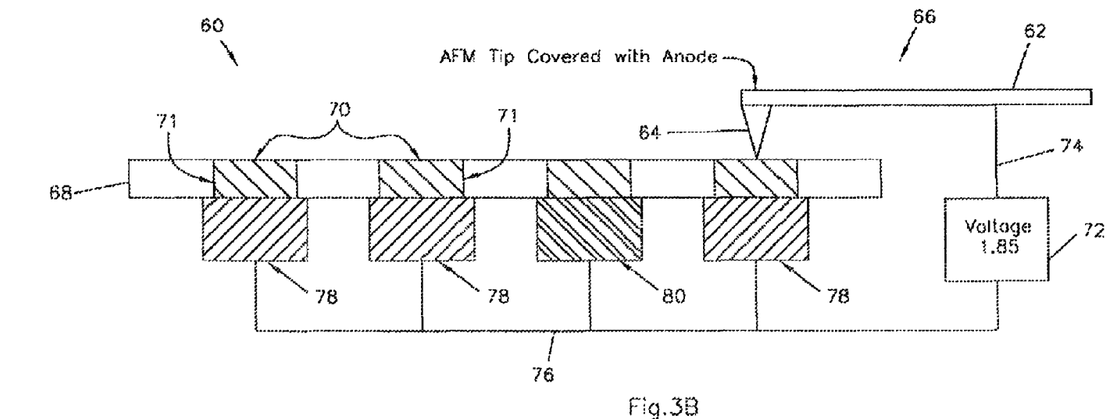
FIG. 3B shows how an AFM tip is used to measure the voltage of a nanocell or microcell.

FIG. 3B shows the same embodiment as shown in FIG. 3A wherein tip 66 has moved across substrate 68 such that it is in contact with electrolyte material above the zinc electrode 78. As with FIG. 3A, the instrumentation 72 measures the potential across the electrochemical cell comprised of a silver cathode and zinc anode. Here, the potential measured is approximately 1.85 volts. By forming the series of partial electrochemical cells having differing anodes, in this case zinc and cadmium, information may be permanently stored in binary code on memory device 60. The sequence, and therefore the information stored, may only be changed by replacing the anodes.

In the embodiment shown in FIGS. 3A and 3B, only zinc and cadmium are used as anodes. However, those skilled in the art will appreciate that there are many materials having different electrochemical potentials that are suitable for forming anodes or cathodes. Those skilled in the art will appreciate that using materials in addition to zinc and cadmium will result in the ability to store information using more than a binary system such as a trinary system or even systems of base 4, 5 or more.

This embodiment lacks protruding upper electrodes on the top side of substrate 68 covering electrolyte material 70 as compared to the embodiment in FIG. 2. This is intended to show that permanent information storage by alternative electrode material does not require a second, permanent electrode. The tip 64 itself may serve as the second electrode in the electrochemical cell. In this embodiment, a laser is not used to determine when tip 64 is in contact with the appropriate part of the substrate, the electrolyte material. However, this embodiment does not require such a safeguard, because all the electrochemical cells will exhibit at least some potential. When tip 64 is in contact with the substrate, there will be zero potential. However, as shown in FIG. 2, information storage by means of altering anode composition may be used in conjunction with permanent second anodes.

Figure 4:
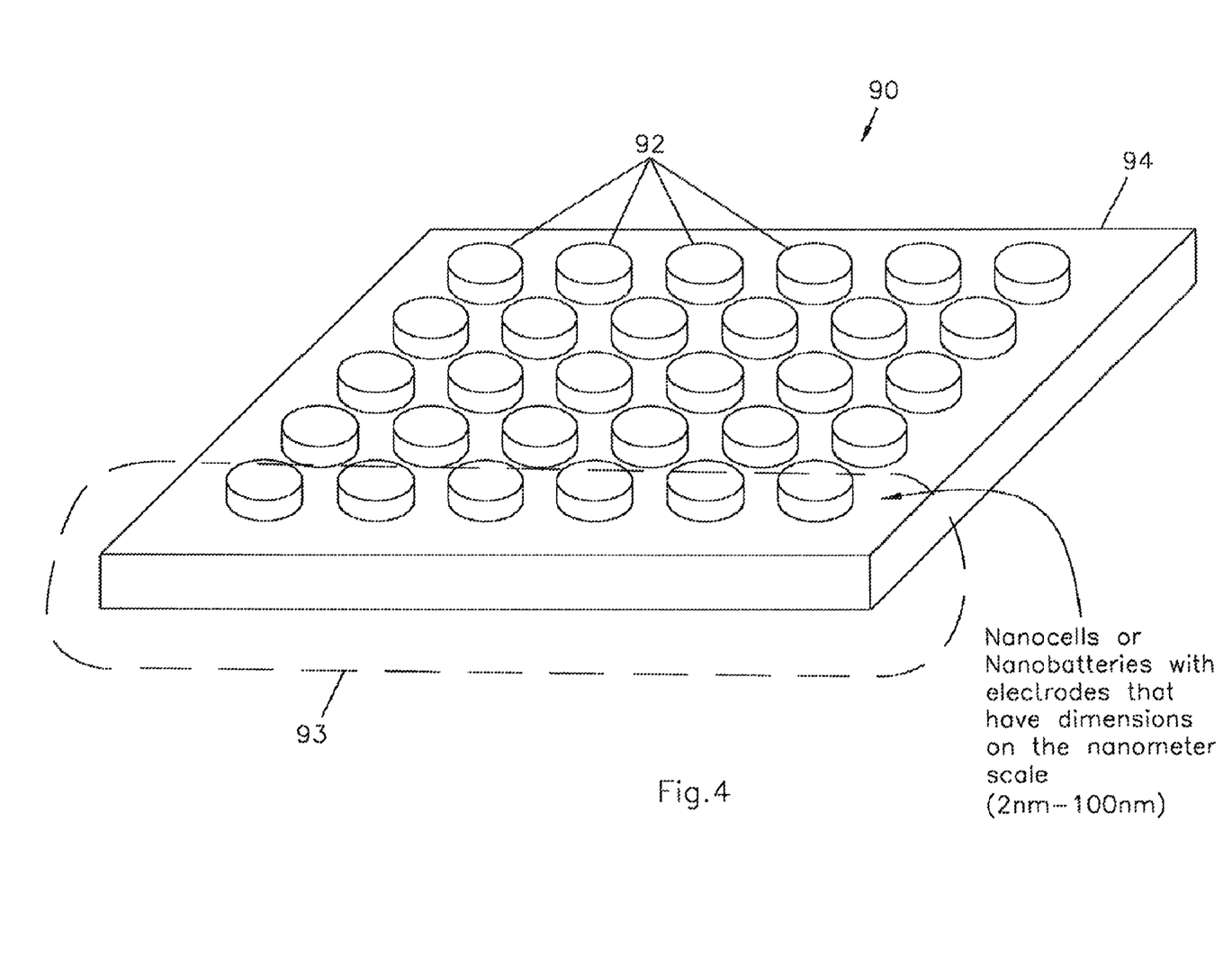
FIG. 4 shows a schematic view of an array of nanocells or nanobatteries.

FIG. 4 shows a preferred embodiment of storage device 90. The storage device 90 is comprised of a substrate 94 having a two-dimensional array of electrochemical cells 92. An array such as this may be utilized for all of the embodiments disclosed herein. In the array shown in FIG. 4, a row of electrodes 93 may be set aside from the rest of the array. While the majority of the array is used for data storage detected by either measuring charge or potential, the row of electrodes 93 is comprised entirely of charged electrochemical cells. Row 93 may be utilized as a power supply for a device that reads the information stored in the remainder of the array. This greatly eases manufacture of microscale and nanoscale devices and increases their utility, as the information storage component and the power supply have been combined into one device. Those skilled in the art will appreciate that this will greatly simplify manufacture of extremely small scale devices, such as microelectrical mechanical systems (MEMS) and nanoelectromechanical systems (NEMS). This increases the potential to enhance the capability of micro and nano devices.

Figure 5:
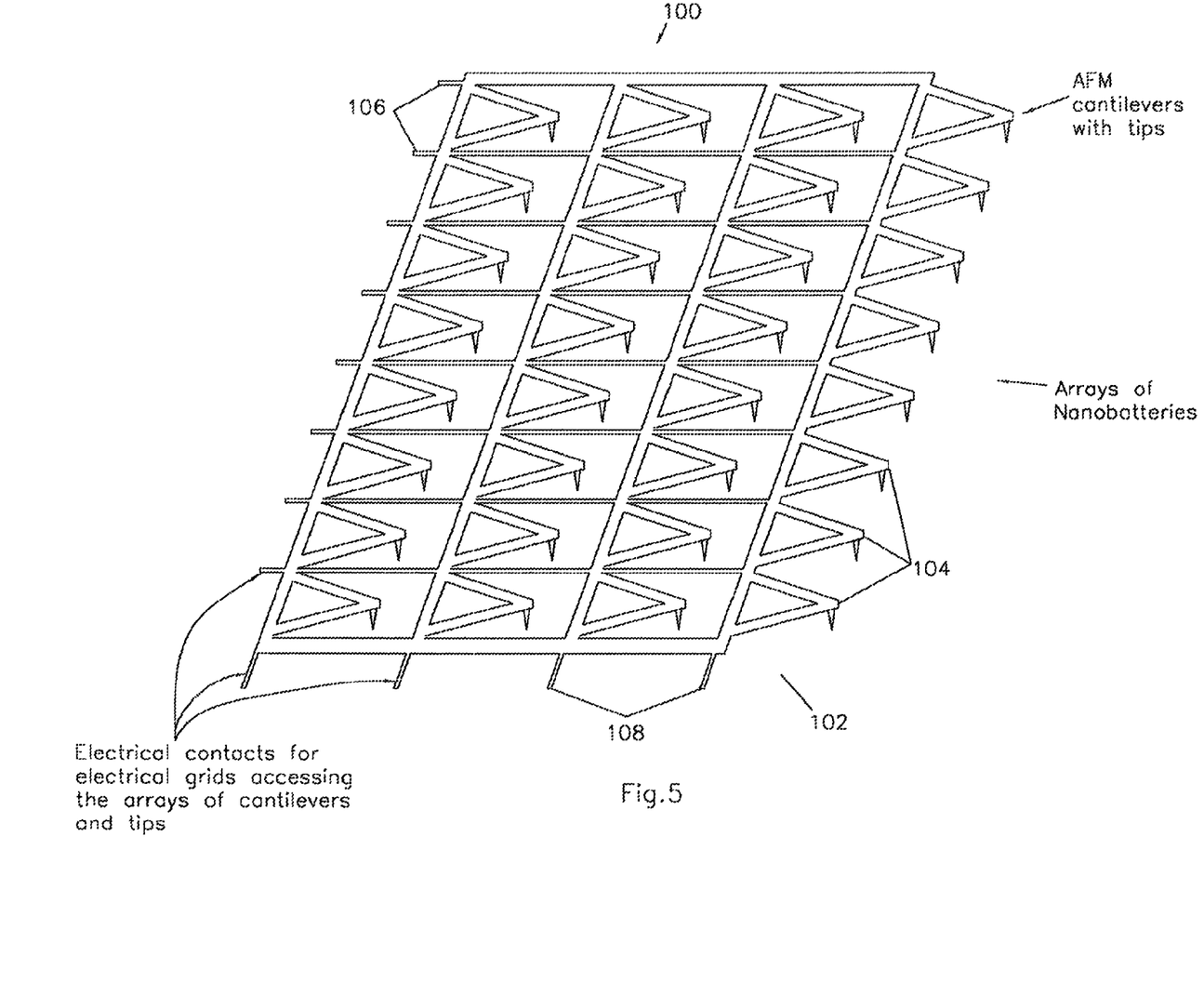
FIG. 5 shows an array of AFM tips for testing, reading or writing onto an array of nanobatteries or nanocells.

FIG. 5 shows an array of AFM tips 100 or these could represent arrays of other types of current conducting probes. It is comprised of multiple AFM tips or other type of current conducting probes 104 that are aligned so that they may be moved across substrate 102 to measure potential and/or charge of electrochemical cells in substrate 102 representing the array of micro or nanocells or batteries shown in FIG. 4. Circuits 108 and 106 form a grid pattern across the AFM tip array 100 and are used to connect the individual AFM tips to instrumentation capable of measuring potential, measuring charge and applying charge to various electrochemical cells within the substrate 102. Those skilled in the art will appreciate combining the electrochemical cell array 90 with AFM tip array 100 will greatly increase the speed with which data may be stored on a memory device or read off of a memory device (See, for example: W. P. King, T. W. Kenny, K. E. Goodson, G. C. M. Despont, U. Durig, H. Rothuizen, G. K. Binnig, P. Vettiger, Applied Physics Letters, 78, 1300 (2001); E. Gorchowski and R. F. Hoyt, IEEE Trans. Magn. 32, 1850 (1996); D. A. Thompson and J. S. Best, IBM J. Res. Dev. 44, 311 (2000)).

One general method of forming an array of cells is to use self-assembly techniques where surfactant molecules or block copolymers would assemble on a flat cathode or anode substrate (See, for example: T. Thurn-Albrecht, R. Steiner, J. DeBouchey, C. M. Stafford, E. Huang, M. Bal, M. Tuominen, C. J. Hawker and T. Russell, *Adv. Mater.*, 12, 787 (2000)). The surfactant molecules and the block copolymers are composed of polar and nonpolar regions. In one form of this technique, the surfactants or copolymer are dissolved in a nonpolar solvent. The polar part of the surfactant or block copolymer will associate inside the nonpolar part of the surfactant molecule or copolymer forming a core of the polar material. When the solution of the block copolymer or surfactant is cast on a solid substrate making a thin film, evaporation of the solvent results in evaporation-induced self-assembly where the core polar material is surrounded by nonpolar material forming very ordered arrays of channels of the polar material. The polar materials in these surfactants and block copolymers would be of a chemical composition suitable for electrolyte use. Thus, the nanopores for the electrolyte would be made. A second method would be to use spin-coated films and to apply an electrical potential during an annealing process. The applied field causes the self-assembly of the block copolymer or surfactant to orient the polar material into ordered arrays of electrolyte channels. Capping the pores with an anode or cathode is accomplished by placing the substrate in a solution containing suspended cathode or anode nanoparticles of the correct size to cover the pores or channels. The appropriate electrode nanoparticles, which can now be purchased from commercial sources, could then be made to adsorb from solution onto the pores by applying a potential. Another method would be a form of dip coating where the film is submerged into a liquid having the nanoparticles suspended. As the film is removed from the liquid, the movement of the liquid/solid contact line would force the particles into the pore openings.

This technique has advantages in terms of the relative ease and cost effectiveness of self-assembly methods. The technique also makes films having a high pore density where the pore size can be as small as from 1-10 nm.

Figure 8:
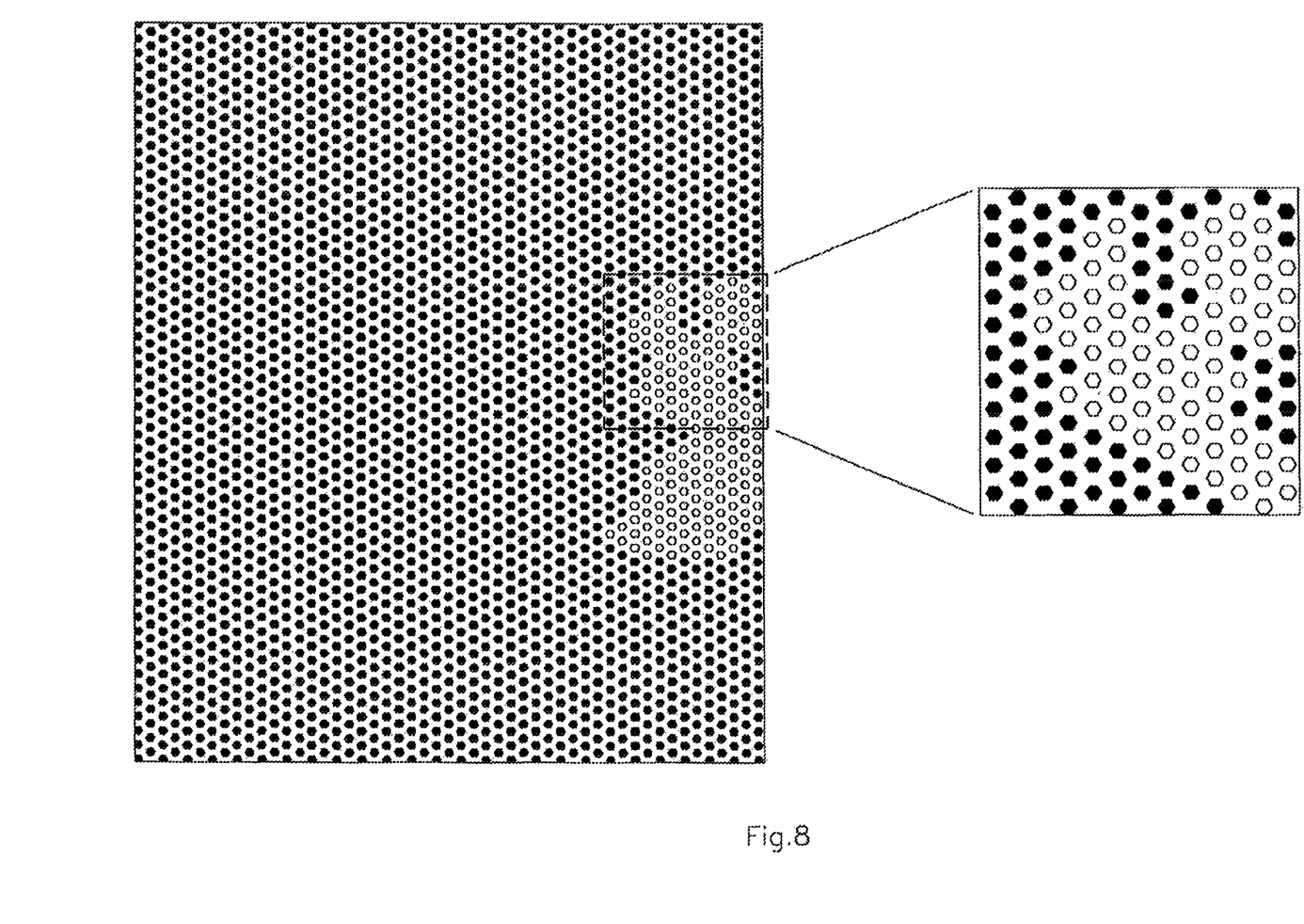
FIG. 8 is a depiction of an electron microscope view with an array of pores, some of which are filled.

Another method is to use aluminum oxide membranes. Alumina membranes having hexagonally ordered pores may serve as the template for the nanobattery arrays. The process for making these membranes consists of applying an electrical potential to an aluminum sheet while in an acid solution. This results in the formation of a porous aluminum oxide film that does not have the regular arrangement of pores necessary for ordered arrays. This oxide layer is removed by an acid wash; however, ordered pits in the original aluminum sheet remain. These pits serve as the template for the a porous oxide layer formed from a second application of current in the acid solution. Because of the ordered pits in the aluminum film, the second oxide layer formed has very ordered pores in a hexagonal configuration Changing the applied voltage and the type of acid used controls the pore diameter. This technique makes very ordered arrays of pores in alumina membranes with pores 120 nm in diameter and smaller (See, for example: H. Masuda, K. Nishio and N. Baba, *Thin Solids Films*, 223, 1, (1993); H. Masuda and K. Fukuda, *Science*, 268, 1466 (1995); A.-P. Li, F. Muller, A. Birner, K. Neilsch, and U Gosele, *Adv. Mater.* 11, 483 (1999); I. Mikulska, S. Juodkazis, R. Tomasiunas, and J. G. Dumas, *Adv. Mater.* 13, 1574 (2001)). These membranes may be used in the manufacture of ordered arrays of nanobatteries. Microbatteries with nano-sized cathodes or anodes may be formed by filling the pores in the alumina membranes with sol gel materials that are cathode materials such as $V_2O_5$ or cathode materials such as $SnO_2$. (See, for example: H. Liu, Y. P. Wu, E. Rahm, R. Holze, H. Q. Wu, Journal of Solid State Electrochemistry 8 (7), 450 (2004); C.-T. Hsieh, J.-M. Chen, H.-W. Huang, International Journal of Nanoscience, 2 (4&5) 299 (2003)). This can be accomplished by using a nanocoating technique (See, for example: C. Dewan and D. Teeters, *Journal of Power Sources* 119-121C, 460 (2003)). Excess from the surface can be removed leaving a filled pore. This is shown in FIG. 8.

Where, for comparison, some 200 nm pores have been filled, and others left unfilled. In the actual process all pores would be filled making arrays of nanobatteries.

Another method of fabrication is the use of microlithographic techniques taking advantage of e-beam lithography, resist technology and sputter coating to make nanobattery arrays. In this method, a cathode or an anode material will be sputter coated on a current-collecting metal substrate. A resist layer will be deposited by spin coating on the deposited cathode. Patterns consisting of ordered arrays of holes will be made by electron exposure to the regions that are to be the holes. Positive resist techniques will be used where the electron-exposed areas will be more soluble in a developer. Exposing the substrate to the developer will remove the e-beam exposed resist, leaving the desired ordered array in the remaining resist. Next, sputter coating is used to deposit an electrolyte and anode or cathode layer, which ever is needed to complement the first layer deposited, over the remaining resist and on the exposed anode or cathode layer in the areas where no resist remains. Lithium phosphorous oxynitride is used as the electrolyte layer since it is a good solid electrolyte that lends itself well to sputter coating. This layer is be deposited first, followed by a layer of anode material such as $SnO_2$ that is also sputter coated onto the lithium phosphorous oxynitride layer. At this point, the remaining resist is removed by a solvent and the lithium phosphorous oxynitride and anode layers on the resist are removed in what is called the "liftoff" process. This leaves the ordered arrays of lithium phosphorous oxynitride and anode resting on a cathode substrate. The description of this process has been somewhat simplified. For instance, undercutting of the resist holes may be necessary to get well-formed stacks of lithium phosphorous oxynitride and anode for each nanobattery. Other configurations of resist may be used to make the appropriate nanobattery structures. Nanobatteries with diameters as small as 250 nm with a separation distance of 250 nm are easily made.

The common use of microlithographic techniques by the integrated circuit industry is a great advantage for the development of nanobattery arrays using this technique. The general techniques are well known and by using these techniques, one will be assured of making ordered arrays. Another advantage of this proposed process is that the thin film battery systems, made by the sputter coating technique described above, perform well and are mechanically and chemically stable.

Figure 6:
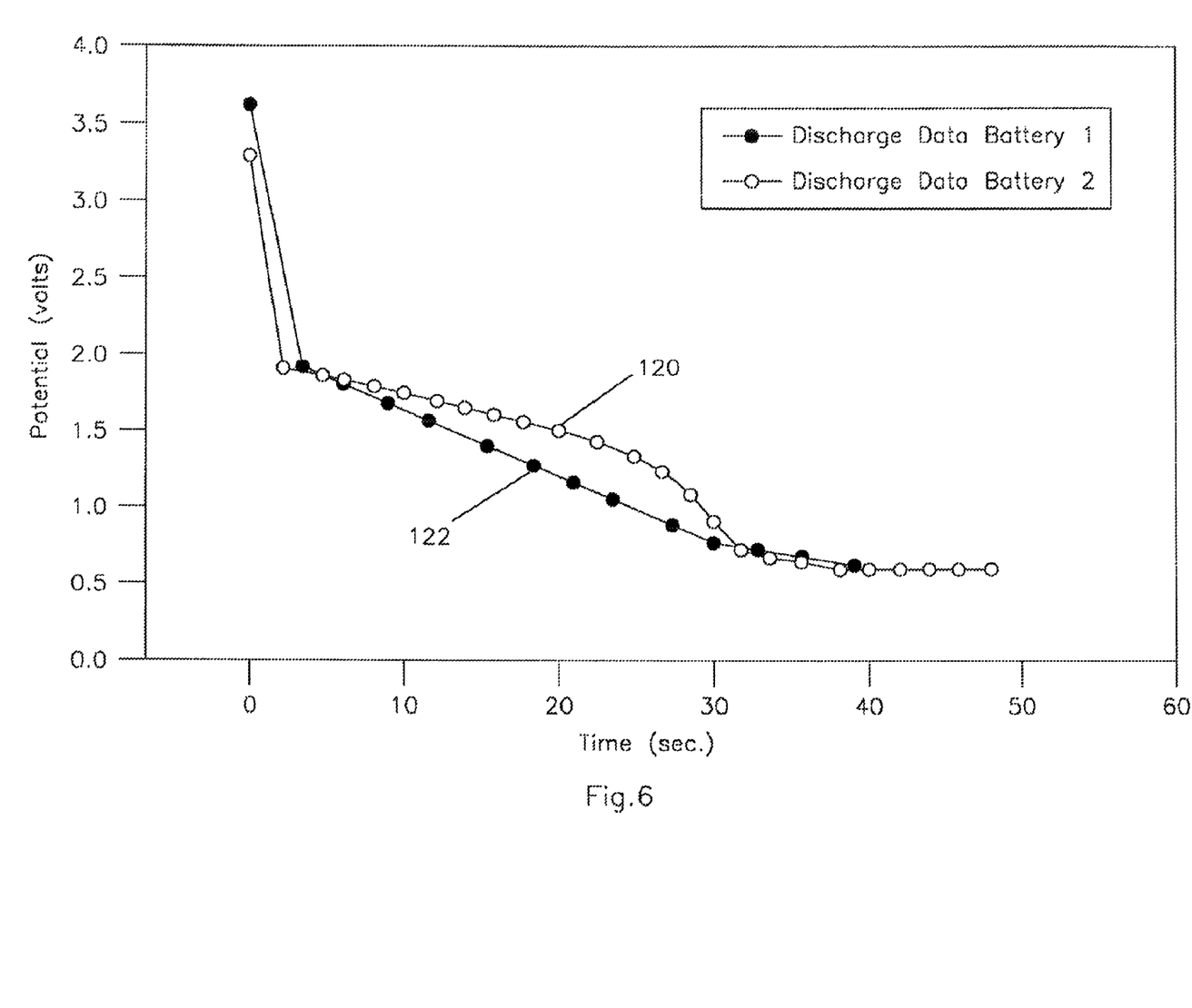
FIG. 6 is a graph of potential versus time for two nanobatteries.

The embodiments described above and the methods of reading information off of the storage devices are described in terms of recording digital information. One of the advantageous of using a system that measures potential and/or charge of individual electrochemical cells is that it may also be utilized to store and read analog data. This is because both charge and potential of the cells described above will decrease over time. The change in potential or charge over time follows a measurable rate of decay. FIG. 6 shows two examples of experimental data collected of how an electrochemical micro cell's potential decreases over time. The slopes of the lines 120 and 122 shown in FIG. 6 are continuous across a range of potential. In order to read analog information, the AFM tip used to read an electrochemical cell is applied to that cell. Instrumentation may be easily programmed to wait a set time period after the tip contacts the electrochemical cell before measuring either charge or potential. This allows the instrumentation to record a value anywhere within the range of maximum and minimum potential of the cell.

Those skilled in the art will appreciate that measuring analog data of a charged cell will drain the charge of the cell. Before such data may be accurately reread, the cell must be recharged. However, the potential of an uncharged electrochemical cell exhibits the same decline over time and naturally returns to its maximum level eventually. This allows for easily rereading electrochemical cells. In addition, one electrochemical cell is capable of storing several analog data points. The instrumentation need only be programmed to measure the potential at different time points. In this fashion, several analog data points may be measured from a single electrochemical cell.

Figure 7:
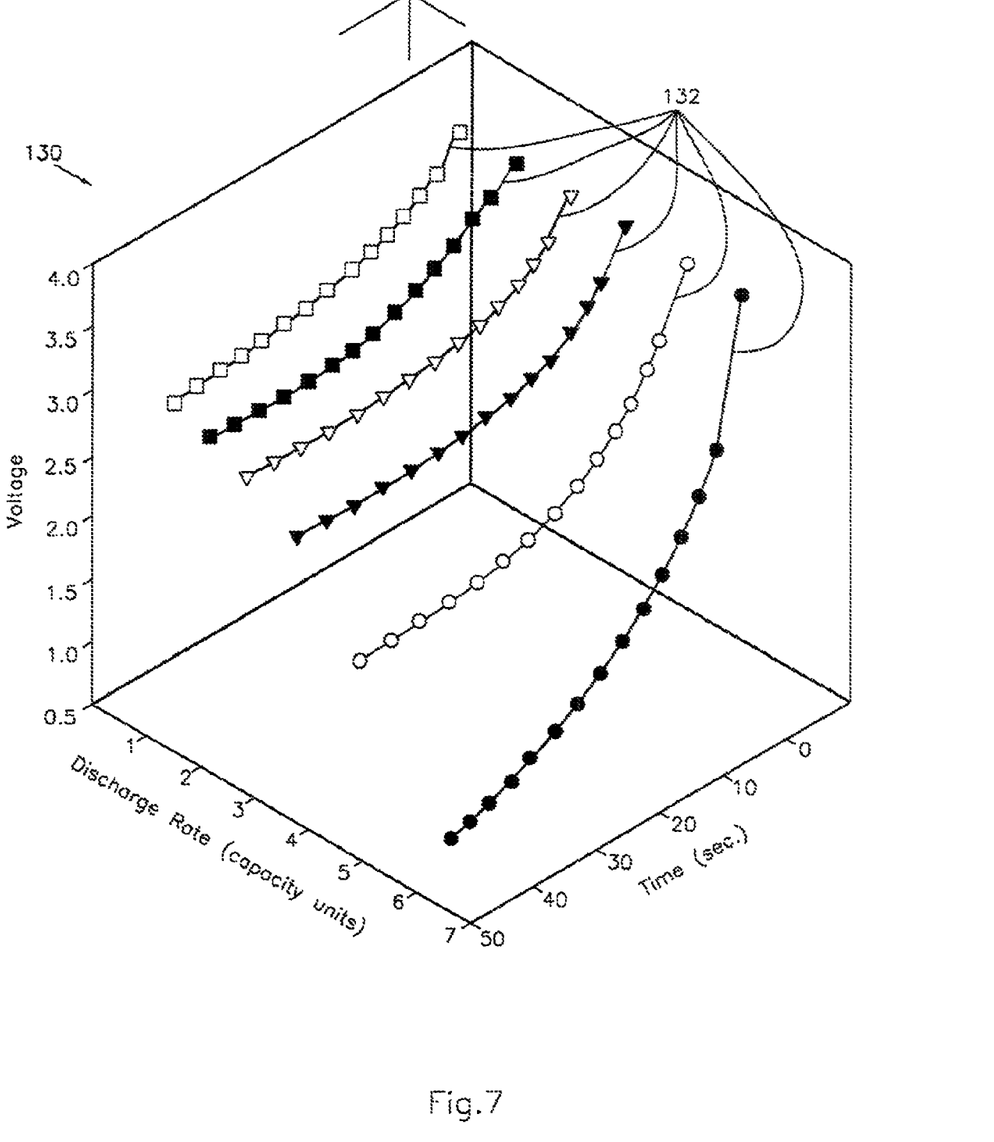
FIG. 7 is a three-dimensional graph showing how voltage decay rates of an individual electrochemical cell may be varied by changing the discharge rate of that cell when measuring its potential.

Additional storage capacity can be obtained by controlling the rate at which the batteries are allowed to be discharged. For instance, if the battery was discharged at its theoretical capacity it would have one discharge rate or rate of voltage decay. If it were discharged at twice its theoretical discharge rate it would have a different voltage decay rate. This is shown in FIG. 7. Three-dimensional graph 130 shows a series of lines 132 that plot the voltage decay of an electrochemical cell over time at varying discharge rates. As the discharge rate is increased, so is the rate of voltage decay. The instrumentation need only be programmed to measure the potential at different time points and discharge rates. In this fashion 3-dimensional storage of data can be accomplished resulting in an even higher density of data points being stored.

Whereas, the present invention has been described in relation to the drawings attached hereto, it should be understood that other and further modifications, apart from those shown or suggested herein, may be made within the spirit and scope of this invention.

What is claimed is:

1. An electrochemical device, comprising:
   a substrate having a top surface and a bottom surface;
   an array of electrochemical cells, each of said electrochemical cells comprising an electrode and an electrolyte, wherein the electrolyte is exposed on the top surface of the substrate;
   at least one electrically conductive probe capable of coming into electrically conductive contact with the electrolyte;
   electronic instrumentation capable of applying a charge, reading a charge, or discharging the electrochemical cells at different rates and measuring potential as a function of time, wherein the instrumentation is in electrically conductive contact with the at least one probe.

2. The device of claim 1 wherein the electrochemical cell comprises a pore that extends from the top surface of the substrate to the bottom surface of the substrate, wherein the electrolyte is in the pore and the electrode is on the bottom surface of the substrate.

3. The device of claim 1 wherein the at least one probe comprises an atomic force microscopy tip.

4. The device of claim 1 wherein the at least one probe comprises a plurality of probes.

5. The device of claim 3 further comprising a means of determining when the tip is in electrically conductive contact with the electrolyte.

6. The device according to claim 5 wherein the means of measuring when the tip is in electrically conductive contact with the electrolyte comprises a laser beam.

7. The device of claim 1 wherein the electrodes of the array of electrochemical cells are in electrically conductive contact with each other.

8. The device of claim 1 wherein the electrodes are comprised of multiple materials.

9. An electrochemical device, comprising:
   a substrate having a top surface and a bottom surface;
   an array of electrochemical cells, each of the electrochemical cells comprising an electrode and an electrolyte, wherein the electrolyte is exposed on the top surface of the substrate;
   an array of electrically conductive probes capable of coming into electrically conductive contact with the electrolyte;
   electronic instrumentation capable of applying a charge, reading a charge, or discharging the electrochemical cells at different rates and measuring potential as a function of time, wherein the instrumentation is in electrically conductive contact with the at least one probe.

10. The device of claim 9 wherein the electrochemical cell comprises a pore that extends from the top surface of the substrate to the bottom surface of the substrate, wherein the electrolyte is in the pore and the electrode is on the bottom surface of the substrate.

11. The device of claim 9 wherein the array of electrically conductive probes comprises an array of atomic force microscopy tips.

12. The device of claim 11 further comprising a means of determining when each of the tips are in electrically conductive contact with the electrolyte.

13. The device according to claim 12 wherein the means of measuring when the tips are in electrically conductive contact with the electrolyte comprises a laser beam.

14. The device of claim 9 wherein the electrodes are in electrically conductive contact with each other.

15. The device of claim 9 wherein the electrodes are comprised of multiple materials.

16. The device of claim 1 wherein the electrodes of the array of electrochemical cells comprise differing materials allowing permanent, non-erasable data to be stored and detected by measuring the differing potentials of the electrodes and/or binary information to be recorded and erased by charging and discharging the electrochemical cells.

17. The device of claim 16 wherein a portion of said array of electrochemical cells comprises charged electrochemical cells to be utilized as a power supply for said device, and wherein the remainder of said array of electrochemical cells comprises information storage electrochemical cells to be utilized for data storage detected by either measuring charge or potential for said device.

18. The device of claim 9 wherein the electrodes of the array of electrochemical cells comprise differing materials allowing permanent, non-erasable data to be stored and detected by measuring the differing potentials of the electrodes and/or binary information to be recorded and erased by charging and discharging the electrochemical cells.

19. The device of claim 18 wherein a portion of said array of electrochemical cells comprises charged electrochemical cells to be utilized as a power supply for said device, and wherein the remainder of said array of electrochemical cells comprises information storage electrochemical cells to be utilized for data storage detected by either measuring charge or potential for said device.

20. An electrochemical device, comprising:
    a substrate having a plurality of pores extending from a top surface of said substrate to a bottom surface of said substrate, wherein each of said pores is filled with an electrolyte thereby forming a two-dimensional array of electrochemical cells;
    at least one electrode on at least a portion of said bottom surface of said substrate and in electrically conductive contact with said electrolyte of said array of electrochemical cells;
    an array of electrically conductive probes capable of coming into electrically conductive contact with said electrolyte to respectively apply a charge, read a charge, or discharge each of said electrochemical cells at differing rates and/or measure respective potentials of each of said electrochemical cells;
    wherein a portion of said two dimensional array of electrochemical cells comprises charged electrochemical cells to be utilized as a power supply for said device, and wherein the remainder of said two dimensional array of electrochemical cells comprises information storage electrochemical cells to be utilized for data storage detected by either measuring charge or potential for said device.

21. The device of claim 20 wherein said array of electrically conductive probes comprises an array of atomic force microscopy tips.

22. The device of claim 20 further comprising a means of determining when each of said electrically conductive probes is in electrically conductive contact with said electrolyte.

23. The device according to claim 22 wherein said means of measuring when each of said electrically conductive probes is in electrically conductive contact with said electrolyte comprises a laser beam.

24. The device of claim 20 wherein said electrode is on the entire bottom surface of said substrate.

25. The device of claim 20 wherein said electrodes is a plurality of electrodes underneath each of said electrochemical cells respectively.

26. The device of claim 25 wherein each of said electrodes is in electrically conductive contact with each other.

27. The device of claim 20 wherein said electrochemical cells have differing open circuit potentials.

28. The device of claim 20 wherein said electrolytes having differing materials.

29. The device of claim 28 wherein said electrolyte having differing materials allow permanent, non-erasable data to be stored and detected by measuring the differing potentials of the electrolyte and/or binary information to be recorded and erased by charging and discharging the electrochemical cells.

30. The device of claim 20 further comprising electrical circuits forming a grid pattern across said array of electrically conductive probes to connect each of said electrically conductive probes to electronic instrumentation capable of applying said charge, reading said charge, or discharging each of said electrochemical cells at different rates and/or measuring potential of each of said electrochemical cells.

\* \* \* \* \*